United States Patent [19]

Robertson, Jr. et al.

[11] Patent Number: 4,655,074

[45] Date of Patent: Apr. 7, 1987

[54] SELF-ZEROING PRESSURE TRANSMITTER WITH AUTOMATIC PRESSURE MANIFOLD

[75] Inventors: John W. Robertson, Jr., Chesterund; Edward Bastijanic, Concord; Edward L. Sterling, Jr., Cleveland, all of Ohio

[73] Assignee: The Babcock & Wilcox Company, New Orleans, La.

[21] Appl. No.: 764,916

[22] Filed: Aug. 12, 1985

[51] Int. Cl.$^4$ .......................... G01L 9/00; G01L 27/00
[52] U.S. Cl. ........................................ 73/4 R; 73/717; 73/756
[58] Field of Search ...................... 73/4 R, 3, 756, 717

[56] References Cited

U.S. PATENT DOCUMENTS

| | | | |
|---|---|---|---|
| 3,509,767 | 5/1970 | Greer | 73/705 |
| 4,476,707 | 10/1984 | Burns et al. | 73/4 R |
| 4,576,035 | 3/1986 | Hooven et al. | 73/4 R |

Primary Examiner—Donald O. Woodiel

Attorney, Agent, or Firm—Vytas R. Matas; Robert J. Edwards

[57] ABSTRACT

A pressure transmitter assembly comprises a pressure transducer having a pair of inputs each connected to a separate pressure line. A valve is connected in each pressure line. A pressure equalizing line is connected between the pressure lines at a point between the valves and the pressure transducer. The pressure equalization line is provided with an equalization valve. All three valves are connected to a switching circuit which is controlled by a microprocessor. The switching circuit functions to open both of the valves in the pressure lines while closing the equalizing valves so that the pressure transducer is exposed to two separate pressure and generates a signal corresponding to a difference in two separate pressures. To zero the transducer and recalibrate the transmitter, the low pressure line valve is closed while the equalizing valve is opened. This equalizes the pressure between the two pressure lines so that any signal from the transducer corresponds to a zero pressure difference value.

6 Claims, 1 Drawing Figure

U.S. Patent     Apr. 7, 1987     4,655,074
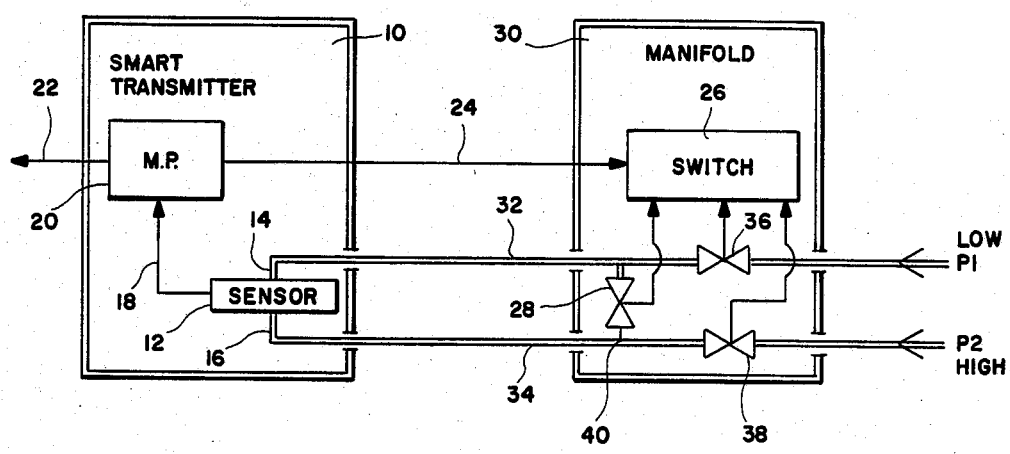

SELF-ZEROING PRESSURE TRANSMITTER WITH AUTOMATIC PRESSURE MANIFOLD

FIELD AND BACKGROUND OF THE INVENTION

The present invention relates in general to pressure transmitters and in particular to a new and useful self-zeroing pressure transmitter.

Two-wire analog transmission systems are well known. Such systems include a transmitter which is connected to a power supply by two wires which form a current loop. The transmitter includes, as at least one of its features, a transducer which senses a condition such as pressure or temperature. This condition is known as a process variable (PV).

A power supply is connected to the two wires to close the current loop. It is also conventional to provide a resistor in the current loop. The transmitter amplifies the signal from its transducer and this amplified signal is used to draw a certain current from the power supply which is proportional or otherwise related to the process variable. It is conventional to draw from a minimum of 4 mA to a maximum of 20 mA. The current between 4 and 20 mA passes through the resistor to produce a voltage drop across the resistor. This voltage drop can be measured to give a value for the process variable.

It is noted that the 4 mA minimum current is required to energize the circuitry of the transmitter. Any excess current above this 4 mA level is taken as a value which can be used to determine the process variable.

It is known that such 4–20 mA two-wire systems have an accuracy which is limited to around 0.1% at best. These systems are also essentially unidirectional with the transmitter being essentially uncontrolled and transmitting continuously.

The transmitters in such circuits are generally limited in accuracy to about 0.1% and their functionality is limited to only continuous reading and sensing of the process variable.

SUMMARY OF THE INVENTION

The present invention utilizes microprocessor technology to improve the overall accuracy and expand the functionality of transmitter sensors, in particular those utilized for sensing a differential in pressure.

The transmitter functionality is expanded by its ability to provide digital communications anywhere along the current loop, with a device such as a computer or a hand held terminal. This allows an operator to check or change transmitter parameters or to verify operation of the transmitter electronics without having to be at the transmitter location. Also the transmitter is mated with an automatic pressure manifold for self-zeroing applications to increase the accuracy of the transmitter.

The biggest problem associated with differential pressure transmitters is with regard to transducer zero shift. A transducer of such transmitters has two ports or surfaces which receive two pressures. The output of the transducer corresponds to the difference in pressure. For situations where the pressure is equal, a zero or predetermined signal must issue from the transducer. According to the invention, a pressure manifold is used for self-zeroing purposes of the transducer.

Accordingly an object of the present invention is to provide a pressure transmitter assembly which comprises a transducer having two inputs each for exposure to a separate pressure to generate a signal corresponding to a difference between the separate pressures, first and second pressure lines connected to the two inputs of the transducer for carrying the separate pressures, a connecting line connected between the first and second pressure lines, with a valve in each of the first, second and connecting lines. Switching means are connected to the valves for closing the two valves in the first and second pressure lines while the valve in the connecting line is open to equalize the pressure between the first and second pressure lines. The switching means also function to open the valves in the first and second pressure lines when the valve in the connecting line is closed to transmit the separate pressures to the transducer. The transmitter is provided with control means for controlling the switch means to self-zero the transducer and also to expose the transducer to the separate pressures.

A further object of the invention is to provide a method for self-zeroing a pressure transmitter which includes the use of the inventive arrangement and the closing of the first low pressure line valve with the opening of the second high pressure line and connecting line valves, and the opening of the first and second pressure line valves with the closing of the connecting line valve.

A further object of the invention is to provide a pressure transducer assembly which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

The only FIGURE in the application is a block diagram showing the present transducer arrangement of the invention.

DESCRIPTION OF THE PREFERRED EMBODIMENT

Referring to the drawing in particular, the invention embodied therein comprises a pressure transducer arrangement which includes a so-called smart transmitter 10 that incorporates a differential pressure transducer or pressure sensor 12 having two inputs at 14 and 16 for receiving two separate pressures P1 and P2 and for generating a signal on a line 18 which corresponds or is proportional to the difference between pressure P1 and P2.

Smart transmitter 10 includes a microprocessor, such as a Motorola 6800 based processor or Intel 80C51, or other control circuit 20 which receives the signal on line 18 and outputs a signal on line 22 which can for example be utilized on a two-wire current loop.

Microprocessor 20 is also connected over a line 24 to switch means shown at 26. Switch means 26 are incorporated in a pressure manifold 30, such as Anderson Greenwood's remote actuating manifold. A first pressure line 32 conveys the pressure P1 to the one input 14 of sensor 12. A second pressure line 34 conveys the pressure P2 to the other input 16 of sensor 12. First and second pressure lines 32,34 pass through manifold 30. A first valve 36 is in first pressure line 32 and a second valve 38 is in second pressure line 34. A connecting line 40 interconnects first and second pressure lines 32,34 at a point between the inputs 14, 16 of sensor 12 and the valves 36,38. Connecting line 40 is provided with an equalizing valve 28.

Upon signals from microprocessor 20 on line 24, switching means 26 operates to open valves 36 and 38 while maintaining valve 28 closed. This exposes the inputs of sensor 12 to the pressure P1 and P2 so that sensor 12 can generate its signal on line 18. When it is suspected that transducer 12 has drifted from its zero position, or at a preselected maintenance time interval, a signal is provided on line 24 from microprocessor 20 to switching means 26 to close valve 36 while opening valve 28. This blocks the lower pressure P1 while establishing a communication over line 40 between first and second pressure lines 32,34. This automatically equalizes the pressures in lines 32 and 34 where they communicate with pressure transducer 12. At this point the signal on line 18 is treated, by microprocessor 20, to be a zero indication for transducer 12. This effects a recalibration of the smart transmitter 10. After a time period which is sufficient to establish an equalization of pressures on lines 32 and 34, a control signal is provided on line 24 to switch means 26 to open valves 36,38 and simultaneously close valve 28. Once exposed to pressures P1 and P2, any changes in the signal from sensor 12 on line 18 are interpreted and correspond to pressure differences between P1 and P2.

While a specific embodiment of the invention has been shown and described in detail to illustrate the application of the principles of the invention, it will understand that the invention may be embodied otherwise without departing from such principles.

What is claimed is:

1. A self-zeroing pressure transducer assembly comprising:
   a pressure transducer having two inputs;
   a first pressure line connected to one of said two inputs;
   a second pressure line connected to the other of said two inputs;
   a first valve in said first pressure line;
   a second valve in said pressure line;
   a pressure equalizing connecting line between said first and second pressure lines at a point on said first and second pressure lines between said first and second valves and said transducer;
   a pressure equalizing valve in said connecting line;
   switch means connected to said first valve and said pressure equalizing valve and functioning upon receiving one control signal to open said first valve while maintaining said pressure equalizing valve closed and, upon receiving another control signal, to close said first valve while opening said pressure equalizing valve for equalizing the pressure between said first and second pressure lines and thus equalizing the pressure at said two inputs of said transducer;
   control means connected to said pressure transducer for receiving its signal and connected to said switch means for generating said one and other control signals to alternately expose said two inputs of said pressure transducer to separate pressures on said first and second pressure lines; and
   said control means comprising a microprocessor with said valves and switch means being incorporated in a pressure manifold embracing said first and second pressure lines and said connecting line.

2. A self-zeroing pressure assembly as set forth in claim 1 wherein said microprocessor outputs a signal suitable for utilizing on a two-wire current loop.

3. A self-zeroing pressure assembly as set forth in claim 2 wherein said microprocessor is a Motorola 6800 processor.

4. A self-zeroing pressure assembly as set forth in claim 1 wherein said pressure manifold is a remote actuating manifold.

5. A method of automatically calibrating a pressure transducer assembly having a transducer with two inputs for receiving two separate pressures on two separate pressure lines by using a microprocessor, comprising:
   establishing communication between the two separate pressure lines while closing off communication between external separate pressures connected to said pressure lines and said pressure transducer for equalizing a pressure between the first and second pressure lines at automatically predetermined maintenance time intervals stored in said microprocessor;
   measuring an output signal from the transducer assembly with the communication established between the first and second pressure lines;
   utilizing the output signal from the transducer assembly as a control signal to said microprocessor indicative of an equal pressure on both inputs of the transducer to calibrate the transducer assembly; and
   said microprocessor opening communication of external separate pressures to the two separate pressure lines after said maintenance time interval and treating all unbalances after opening communication as measurements by said transducer.

6. A method as set forth in claim 3 wherein said two separate pressure lines are enclosed in a manifold.

* * * * *